(12) United States Patent  (10) Patent No.: US 7,903,534 B2
Kwon et al.  (45) Date of Patent: Mar. 8, 2011

(54) OPTICAL RECORDING MEDIUM, APPARATUS AND METHOD OF MANUFACTURING OPTICAL RECORDING MEDIUM, AND APPARATUS AND METHOD OF RECORDING/REPRODUCING DATA OF OPTICAL RECORDING MEDIUM

(75) Inventors: Joon-hwan Kwon, Suwon-si (KR); Sung-hee Hwang, Suwon-si (KR); Kyung-geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 460 days.

(21) Appl. No.: 11/939,756

(22) Filed: Nov. 14, 2007

(65) Prior Publication Data

US 2008/0117753 A1  May 22, 2008

(30) Foreign Application Priority Data

Nov. 17, 2006 (KR) .................... 10-2006-0113902

(51) Int. Cl.
*G11B 7/24* (2006.01)
(52) U.S. Cl. ................... 369/275.3; 369/59.25
(58) Field of Classification Search ................ None
See application file for complete search history.

(56) References Cited

U.S. PATENT DOCUMENTS

| 6,947,364 B1* | 9/2005 | Hogan et al. ............. 369/53.45 |
| 7,570,570 B2* | 8/2009 | Mashimo ................. 369/124.01 |
| 2002/0024914 A1 | 2/2002 | Kobayashi |
| 2002/0181376 A1* | 12/2002 | Acker ...................... 369/59.25 |
| 2003/0012088 A1* | 1/2003 | Bakx et al. .............. 369/30.07 |
| 2003/0112725 A1* | 6/2003 | Kobayashi et al. ...... 369/47.22 |
| 2004/0233812 A1 | 11/2004 | Kobayashi |
| 2005/0163004 A1 | 7/2005 | Suzuki |
| 2006/0187792 A1* | 8/2006 | Woerlee et al. .......... 369/59.25 |
| 2007/0019513 A1* | 1/2007 | Mashimo ................. 369/44.13 |
| 2007/0283377 A1* | 12/2007 | Nakamura et al. ........... 720/718 |

FOREIGN PATENT DOCUMENTS

| KR | 2003-68250 | 8/2003 |
| KR | 2006-36140 | 4/2006 |

OTHER PUBLICATIONS

International Search Report and Written Opinion issued in corresponding International Application No. PCT/KR2007/005722 dated Feb. 25, 2008.
European Search Report issued on Apr. 21, 2010, in corresponding European Application No. 07834029.6 (3 pages).

* cited by examiner

*Primary Examiner* — Peter Vincent Agustin
(74) *Attorney, Agent, or Firm* — NSIP Law

(57) ABSTRACT

An optical recording medium, an apparatus and method of manufacturing an optical recording medium, and an apparatus and method of recording/reproducing data of an optical recording medium, allocated with a wobble address suitable for a capacity of a high density recording disc, the optical recording medium including a wobble address that corresponds to a recording unit block on which data is recorded on the optical recording medium, wherein the wobble address includes a plurality of wobble address units, and each wobble address unit includes address information in 28 bits, auxiliary information in 8 bits, and parity information in 24 bits.

29 Claims, 10 Drawing Sheets

LAND (30)  GROOVE (20)

LAND (30)

FIG. 6 (PRIOR ART)

ECC: Nibble (4 bits) based ID RS(15, 9, 7)

| Layer | 3 bits |
| --- | --- |
| RUB | 19 bits |
| Address number/RUB | 2 bits |
| Aux data | 12 bits |
| Parity | 24 bits |
| Total | 60 bits | total 15 nibbles

| | | | | |
| --- | --- | --- | --- | --- |
| Nibble 0 | layer no. bit 2 | layer no. bit 1 | layer no. bit 0 | ADIP address 6 nibbles |
| Nibble 1 | RUB no. bit 17 | RUB no. bit 16 | RUB no. bit 15 | |
| Nibble 2 | RUB no. bit 13 | RUB no. bit 12 | RUB no. bit 11 | |
| Nibble 3 | RUB no. bit 9 | RUB no. bit 8 | RUB no. bit 7 | |
| Nibble 4 | RUB no. bit 5 | RUB no. bit 4 | RUB no. bit 3 | |
| Nibble 5 | RUB no. bit 1 | RUB no. bit 0 | address no. bit 1 | |
| Nibble 6 | reserve bit 11 | reserve bit 10 | reserve bit 9 | Aux data 3 nibbles |
| Nibble 7 | reserve bit 7 | reserve bit 6 | reserve bit 5 | |
| Nibble 8 | reserve bit 3 | reserve bit 2 | reserve bit 1 | |
| Nibble 9 | parity bit 23 | parity bit 22 | parity bit 21 | Nibbled based ID-RS ECC 6 nibbles |
| Nibble 10 | parity bit 19 | parity bit 18 | parity bit 17 | |
| Nibble 11 | parity bit 15 | parity bit 14 | parity bit 13 | |
| Nibble 12 | parity bit 11 | parity bit 10 | parity bit 9 | |
| Nibble 13 | parity bit 7 | parity bit 6 | parity bit 5 | |
| Nibble 14 | parity bit 3 | parity bit 2 | parity bit 1 | |

(data 9 nibbles / parity 6 nibbles)

\* parity bits are recorded as inverted bits

FIG. 8

| nibble | Bit 3 | Bit 2 | Bit 1 | Bit 0 | | | |
|---|---|---|---|---|---|---|---|
| Nibble 0 | AA27 | AA26 | AA25 | AA24 | | | |
| Nibble 1 | AA23 | AA22 | AA21 | AA20 | | | |
| Nibble 2 | AA19 | AA18 | AA17 | AA16 | | | |
| Nibble 3 | AA15 | AA14 | AA13 | AA12 | 7 nibbles | ATP Address | —710 |
| Nibble 4 | AA11 | AA10 | AA9 | AA8 | | | |
| Nibble 5 | AA7 | AA6 | AA5 | AA4 | | | |
| Nibble 6 | AA3 | AA2 | AA1 | AA0 | | | |
| Nibble 7 | AX7 | AX6 | AX5 | AX4 | 2 nibbles | AUX Data | —720 |
| Nibble 8 | AX3 | AX2 | AX1 | AX0 | | | |
| Nibble 9 | Parity bit 23 | Parity bit 22 | Parity bit 21 | Parity bit 20 | | | |
| Nibble 10 | Parity bit 19 | Parity bit 18 | Parity bit 17 | Parity bit 16 | | | |
| Nibble 11 | Parity bit 15 | Parity bit 14 | Parity bit 13 | Parity bit 12 | 6 nibbles | Nibble based IO-RS ECC | —730 |
| Nibble 12 | Parity bit 11 | Parity bit 10 | Parity bit 9 | Parity bit 8 | | | |
| Nibble 13 | Parity bit 7 | Parity bit 6 | Parity bit 5 | Parity bit 4 | | | |
| Nibble 14 | Parity bit 3 | Parity bit 2 | Parity bit 1 | Parity bit 0 | | | |

FIRST AREA A    SECOND AREA B

OPTICAL RECORDING MEDIUM, APPARATUS AND METHOD OF MANUFACTURING OPTICAL RECORDING MEDIUM, AND APPARATUS AND METHOD OF RECORDING/REPRODUCING DATA OF OPTICAL RECORDING MEDIUM

CROSS-REFERENCE TO RELATED APPLICATION

This application claims all benefits accruing under 35 U.S.C. §119 from Korean Patent Application No. 2006-113902, filed on Nov. 17, 2006 in the Korean Intellectual Property Office, the disclosure of which is incorporated herein by reference.

BACKGROUND OF THE INVENTION

1. Field of the Invention

Aspects of the present invention relate to an optical recording medium, an apparatus and method of manufacturing an optical recording medium, and an apparatus and method of recording/reproducing data of an optical recording medium allocated with wobble address suitable for a capacity of a high density recording disc.

2. Description of the Related Art

Optical discs (such as compact discs (CD), digital versatile discs (DVD), Blu-ray discs (BD), and high density digital versatile discs (HD-DVD)) have been developed to have high density recoding capacities. Such a high density recording capacity can be obtained using two methods. First, a recording density per surface area can be increased using a short wave laser. Second, a recording layer of a disc can be raised. Optical discs and recording/reproducing systems having higher densities are being developed using a laser having the same wavelength as a BD, which currently has the highest density.

FIG. 1 is a diagram illustrating an optical disc 10, which is an optical recording medium having data tracks. Referring to FIG. 1, spiral groove tracks and spiral land tracks are formed on the optical disc 10. The tracks may be wobbled with a predetermined frequency in order to show address information.

FIG. 2 is an example of the tracks of an optical disc 10, shown in FIG. 1. Referring to FIG. 2, a wobble signal is recorded while manufacturing an optical disc 10. In other words, the wobble signal is recorded while recording a groove track 20 using a laser beam during a mastering process by changing forms of both walls of the groove track 20. The forms of both walls of the groove track 20 are changed by adding a certain amount of offsets to the laser beam in a radius direction of the optical disc 10. The groove tracks 20 are formed in a spiral form in a predetermined interval from the center of the optical disc 10, and a land track 30 is formed between the groove tracks 20.

FIG. 3 is a diagram illustrating a conventional wobble address. Referring to FIG. 3, an optical disc 10 includes a recording unit block (RUB) 400, which is a unit for recording data. A wobble address corresponding to the RUB 400 includes three address units (ADIPs) (i.e., ADIP #1 100, ADIP #2 200, and ADIP #3 300).

FIG. 4 is a diagram illustrating a detailed structure of the wobble address of FIG. 3. Referring to FIG. 4, each ADIP includes a sync part and a data part. For example, ADIP #1 100 is 83 bits. Specifically, a sync part 110 of 8 bits identifies a front part of the ADIP #1 100, and a data part 120 of 75 bits stores actual data of address information.

The data part 120 includes 15 ADIP blocks 121 through 123, and each ADIP block 121 through 123 includes a monotone bit and 4 ADIP bits. In other words, the data part 120 includes 15 monotone bits and 60 ADIP bits. A detailed structure of 60 ADIP bits 500 is illustrated in FIG. 5.

FIG. 5 is a diagram illustrating a more detailed structure of the wobble address of FIG. 4. Referring to FIG. 5, 60 ADIP bits 500 include address data 510 in 24 bits, auxiliary data 520 for recording additional information (such as a recording condition) in 12 bits, and parity data 530 for correcting an error in the address data in 24 bits.

When the optical disc 10 is multi-layered, the address data 510 includes layer information 511 indicating a layer number in 3 bits, RUB information 512 indicating an address of an RUB in 19 bits, and an address in RUB 513 showing an address of an ADIP in an RUB in 2 bits.

FIG. 6 illustrates a bit configuration of the address data 510 of FIG. 5. Referring to FIG. 6, one nibble is 4 bits, and each instance of the address data includes address data in 6 nibbles, auxiliary data in 3 nibbles, and parity data in 6 nibbles.

In the structure of the wobble address as described above, the wobble address is expressed in 24 bits. In particular, excluding the top 3 bits indicating a layer number and the bottom 2 bits indicating a location in one RUB, the number of bits showing one RUB is 19 bits. In other words, $2^{19}$ different RUBs can be shown, where each RUB has a capacity of 2048*32 bytes (64 Kbytes). Accordingly, a capacity of a recording medium that can be shown in 19 bits is as follows.

64 Kbytes * $2^{19}$=34,359,738,368 bytes=approximately 34 Gbytes

However, optical discs having recording densities of over 34 gigabytes have been developed. Thus, using a conventional ADIP address structure, the capacity of a recording medium cannot be entirely expressed.

Accordingly, a method of coping with a high density optical disc while minimizing changes to a conventional system is required.

SUMMARY OF THE INVENTION

Aspects of the present invention provide an optical recording medium, an apparatus and method of manufacturing an optical recording medium, and a recording/reproducing apparatus and method, allocated with wobble address suitable for a capacity of a high density recording disc.

Additional aspects and/or advantages of the invention will be set forth in part in the description which follows and, in part, will be obvious from the description, or may be learned by practice of the invention.

According to an aspect of the present invention, there is provided an optical recording medium to be executed by a recording/reproducing apparatus, the optical recording medium including: a recording unit block on which data is recorded/reproduced by the recording/reproducing apparatus; and a wobble address corresponding to the recording unit block, the wobble address including a plurality of wobble address units, and each wobble address unit includes address information indicating an address of the recording unit block on the optical recording medium in 28 bits, auxiliary information in 8 bits, and parity information in 24 bits.

The address information may include layer information indicating a layer number of the recording unit block on the optical recording medium 3 bits, recording unit block address information indicating the address of the recording unit block on the optical recording medium in 23 bits, and address information indicating an address of the corresponding wobble address unit in the recording unit block in 2 bits.

The address information of 28 bits may include a reserved area in 3 bits, layer information in 3 bits, recording unit block address information in 20 bits, and address information in 2 bits, of the corresponding wobble address unit in the recording unit block.

According to another aspect of the present invention, there is provided an optical recording medium having a first area and a second area on which data is recorded/reproduced by a recording/reproducing apparatus, the optical recording medium including: a recording unit block on which the data is recorded/reproduced; and a wobble address corresponding to the recording unit block and indicating a location of the recording unit block in the optical recording medium, the wobble address including a plurality of address units (ADIPs), wherein each ADIP includes address information on a location of the corresponding ADIP in the recording unit block, such that the recording/reproducing apparatus determines whether the recording unit block is in the first area or the second area of the optical recording medium according to a combination of the address information of all of the plurality of ADIPs.

The wobble address may include 3 ADIPs, and the address information may be 2 bits.

When the combination of the address information of all of the plurality of ADIPs is 100100, the wobble address may be an address of the first area, and when the combination of the address information of all of the plurality of ADIPs is 111001, the wobble address may be an address of the second area.

According to another aspect of the present invention, there is provided a manufacturing apparatus for manufacturing an optical recording medium, the manufacturing apparatus including: a controller to control a generation of a wobble address on the optical recording medium corresponding to a recording unit block on which data is recorded/reproduced on/from the optical recording medium, wherein the wobble address includes a plurality of wobble address units, and each wobble address unit includes address information in 28 bits, auxiliary information in 8 bits, and parity information in 24 bits; and a cutter to cut the generated wobble address on the optical recording medium according to a control of the controller.

According to another aspect of the present invention, there is provided a manufacturing apparatus for manufacturing an optical recording medium having a first area and a second area on which data is recorded/reproduced by a recording/reproducing apparatus, the manufacturing apparatus including: a controller to control a generation of a wobble address on the optical recording medium corresponding to a recording unit block on which data is recorded/reproduced on/from the optical recording medium, wherein the wobble address includes a plurality of address units (ADIPs), and each ADIP includes address information indicating a location of the corresponding ADIP in the recording unit block, such that the recording/reproducing apparatus determines whether the recording unit block is in the first area or the second area of the optical recording medium according to a combination of the address information from all of the plurality of ADIPs; and a cutter to cut the wobble address on the optical recording medium according to a control of the controller.

According to another aspect of the present invention, there is provided an apparatus for recording/reproducing data of an optical recording medium, the apparatus including: a signal processor to process a signal of a wobble address from the optical recording medium, the wobble address corresponding to a recording unit block on which data is recorded/reproduced on/from the optical recording medium, wherein the wobble address includes a plurality of wobble address units, and each wobble address unit includes address information in 28 bits, auxiliary information in 8 bits, and parity information in 24 bits; and a controller to control the signal processor to record the data on the recording unit block corresponding to the wobble address detected by processing the signal or to read the data from the recording unit block corresponding to the wobble address.

According to another aspect of the present invention, there is provided an apparatus for recording/reproducing data of an optical recording medium having a first area and a second area, the apparatus including: a signal processor to process a signal of a wobble address from the optical recording medium, the wobble address corresponding to a recording unit block on which the data is recorded/reproduced on/from the optical recording medium, wherein the wobble address includes a plurality of address units (ADIPs), and each ADIP includes address information indicating a location of the corresponding ADIP in the recording unit block, such that the apparatus determines whether the recording unit block is in the first area or the second area of the optical recording medium according to a combination of the address information from all of the plurality of ADIPs; and a controller to control the signal processor to record data on the recording unit block corresponding to the wobble address detected by processing the signal or to read data from the recording unit block corresponding to the wobble address.

According to another aspect of the present invention, there is provided a method of manufacturing an optical recording medium, the method including: generating a wobble address corresponding to a recording unit block on which data is recorded/reproduced on/from the optical recording medium, wherein the wobble address includes a plurality of wobble address units and each wobble address unit includes address information in 28 bits, auxiliary information in 8 its, and parity information in 24 bits; and cutting the generated wobble address on the optical recording medium.

According to another aspect of the present invention, there is provided a method of manufacturing an optical recording medium having a first area and a second area on which data is recorded/reproduced by a recording/reproducing apparatus, the method including: generating a wobble address on the optical recording medium corresponding to a recording unit block on which the data is recorded/reproduced on/from the optical recording medium, wherein the wobble address includes a plurality of address units (ADIPs), and each ADIP includes address information indicating a location of the corresponding ADIP in the recording unit block, such that the recording/reproducing apparatus determines whether the recording unit block is in the first area or the second area of the optical recording medium according to a combination of the address information from all of the plurality of ADIPs; and cutting the wobble address on the optical recording medium.

According to another aspect of the present invention, there is provided a method of recording/reproducing data of an optical recording medium, the method including: processing a signal of a wobble address from the optical recording medium, the wobble address corresponding to a recording unit block on which the data is recorded/reproduced on/from the optical recording medium, wherein the wobble address includes a plurality of wobble address units, and each wobble address unit includes address information in 28 bits, auxiliary information in 8 bits, and parity information in 24 bits; and recording the data on the recording unit block corresponding to the wobble address detected by the processing of the signal or reading the data from the recording unit block corresponding to the wobble address.

According to another aspect of the present invention, there is provided a method of recording/reproducing data of an optical recording medium having a first area and a second area, the method including: processing a signal of a wobble address from the optical recording medium, the wobble address corresponding to a recording unit block on which the data is recorded/reproduced on/from the optical recording medium, wherein the wobble address includes a plurality of address units (ADIPs), and each ADIP includes address information indicating a location of the corresponding ADIP in the recording unit block, such that it is determined whether the recording unit block is in the first area or the second area of the optical recording medium according to a combination of the address information from all of the plurality of ADIPs; and recording the data on the recording unit block corresponding to the wobble address detected by the processing of the signal or reading the data from the recording unit block corresponding to the wobble address.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 6 illustrates a bit configuration of address data of FIG. 5;

FIG. 8 is a diagram illustrating a bit structure of the address data illustrated in FIGS. 7A and 7B;

DETAILED DESCRIPTION OF THE EMBODIMENTS

Figure 1:
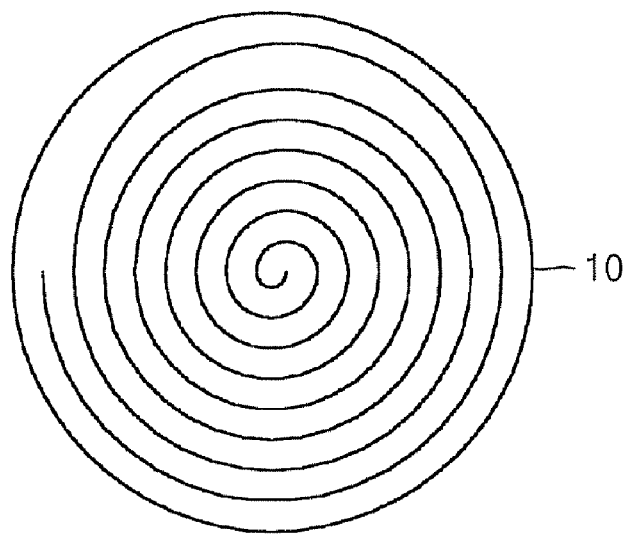
FIG. 1 is a diagram illustrating an optical disc, which is an information storage medium having tracks.
Figure 2:
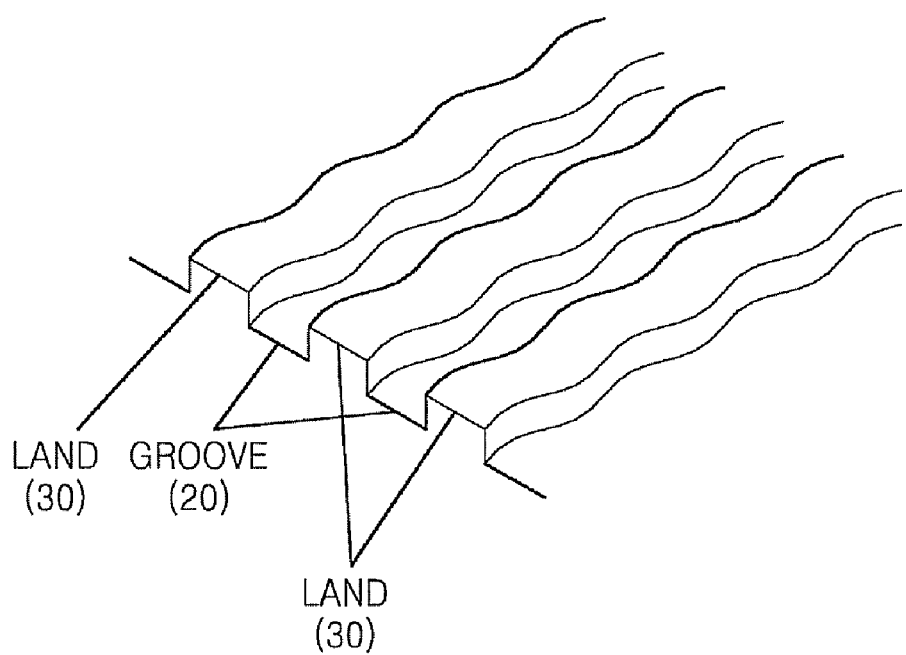
FIG. 2 is an example of the tracks of an optical disc shown in FIG. 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

According to aspects of the present invention, a method of allocating wobble address suitable for a capacity of a high density recording disc allocates fewer bits for auxiliary data as compared to a conventional method. Accordingly, more bits can be used for address information.

Figure 7A:
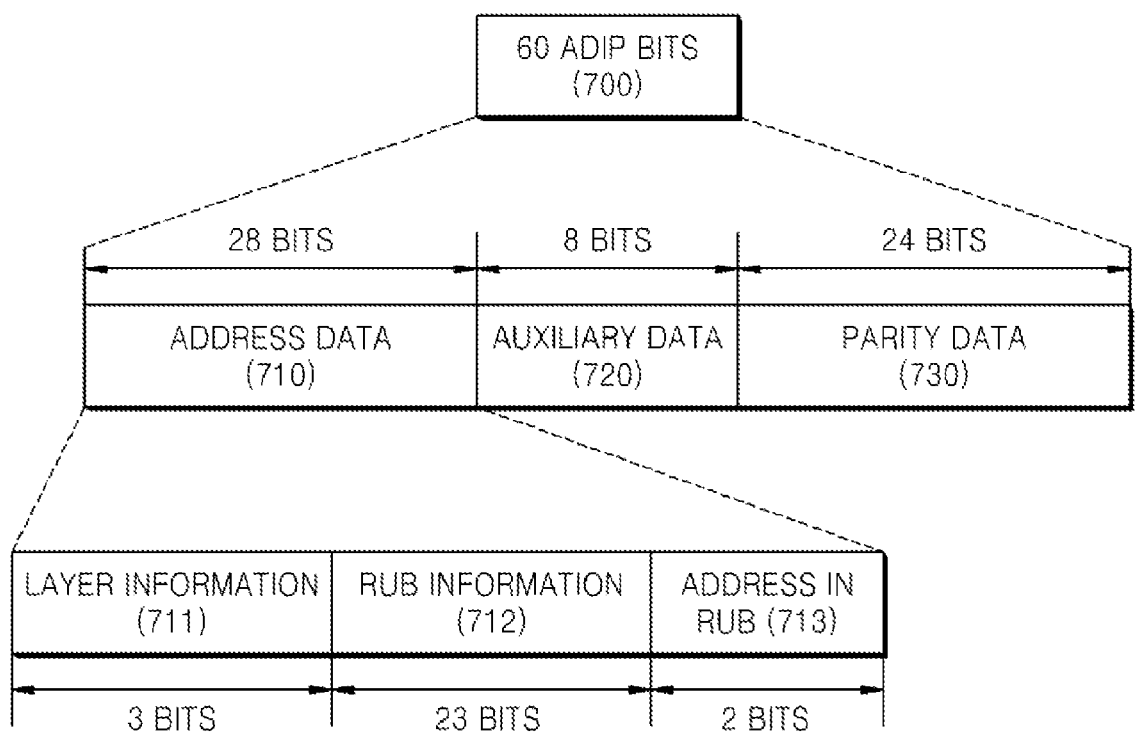
FIG. 7A is a diagram illustrating a structure of address data of a wobble address according to an example embodiment of the present invention.

FIG. 7A is a diagram illustrating a structure of address data of a wobble address according to an example embodiment of the present invention. Referring to FIG. 7A, 60 address unit (ADIP) bits 700 include address data 710 in 28 bits, auxiliary data 720 in 8 bits, and parity data 730 in 24 bits. The auxiliary data 720, which was conventionally 12 bits, is reduced to 8 bits, and the address data 710, which was conventionally 24 bits, is increased to 28 bits.

The address data 710 includes layer information 711 in 3 bits, recording unit block (RUB) information 712 in 23 bits, and an address in RUB 713 in 2 bits. Accordingly, $2^{23}$ different RUBs can be shown while maintaining the conventional size of an RUB.

Figure 7B:
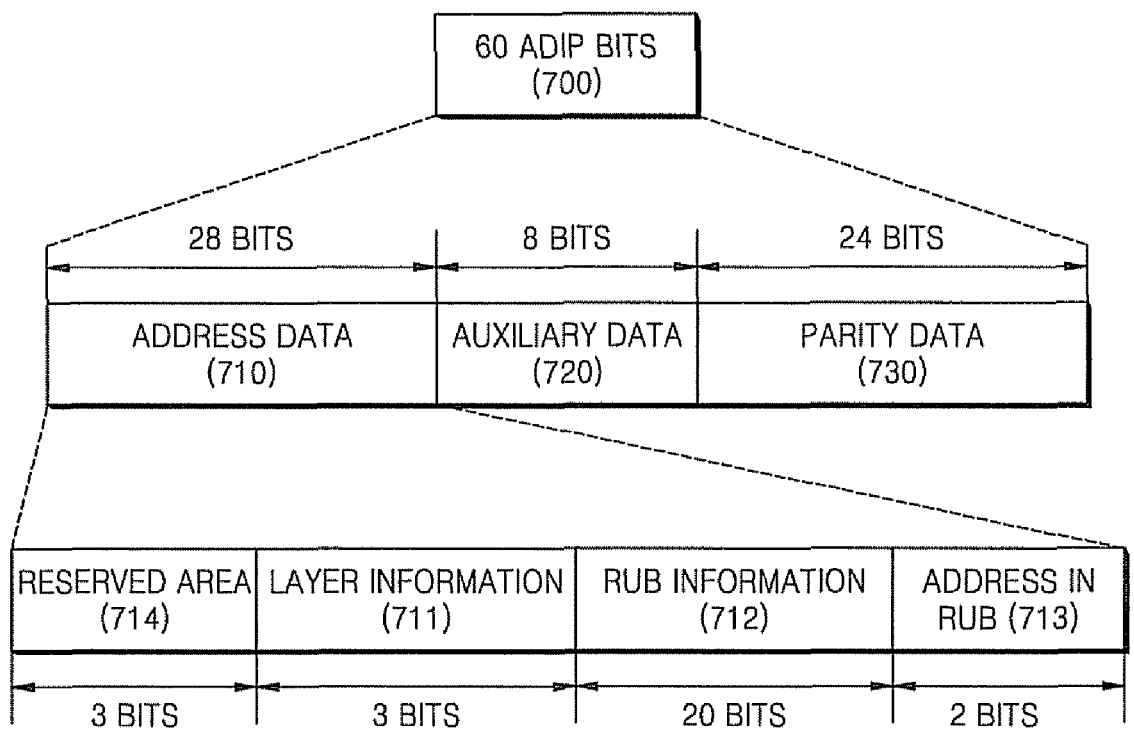
FIG. 7B is a diagram illustrating a structure of address data of a wobble address according to another example embodiment of the present invention.

FIG. 7B is a diagram illustrating a structure of address data of a wobble address according to another example embodiment of the present invention. Referring to FIG. 7B, 60 ADIP bits 700 include address data 710 in 28 bits, auxiliary data 720 in 8 bits, and parity data 730 in 24 bits. The auxiliary data 720, which was conventionally 12 bits, is reduced to 8 bits, and the address data 710, which was conventionally 24 bits, is increased to 28 bits.

Figure 3:
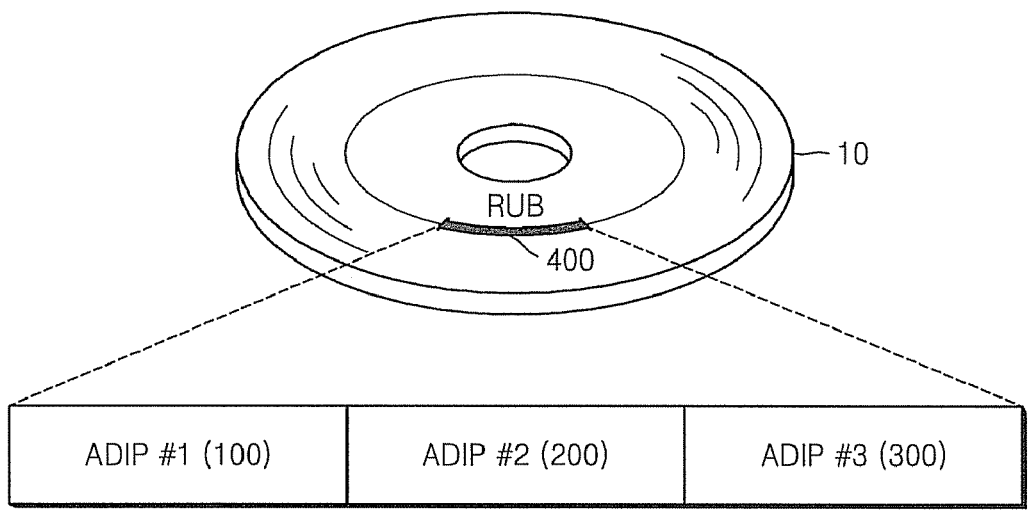
FIG. 3 is a diagram illustrating a conventional wobble address.
Figure 4:
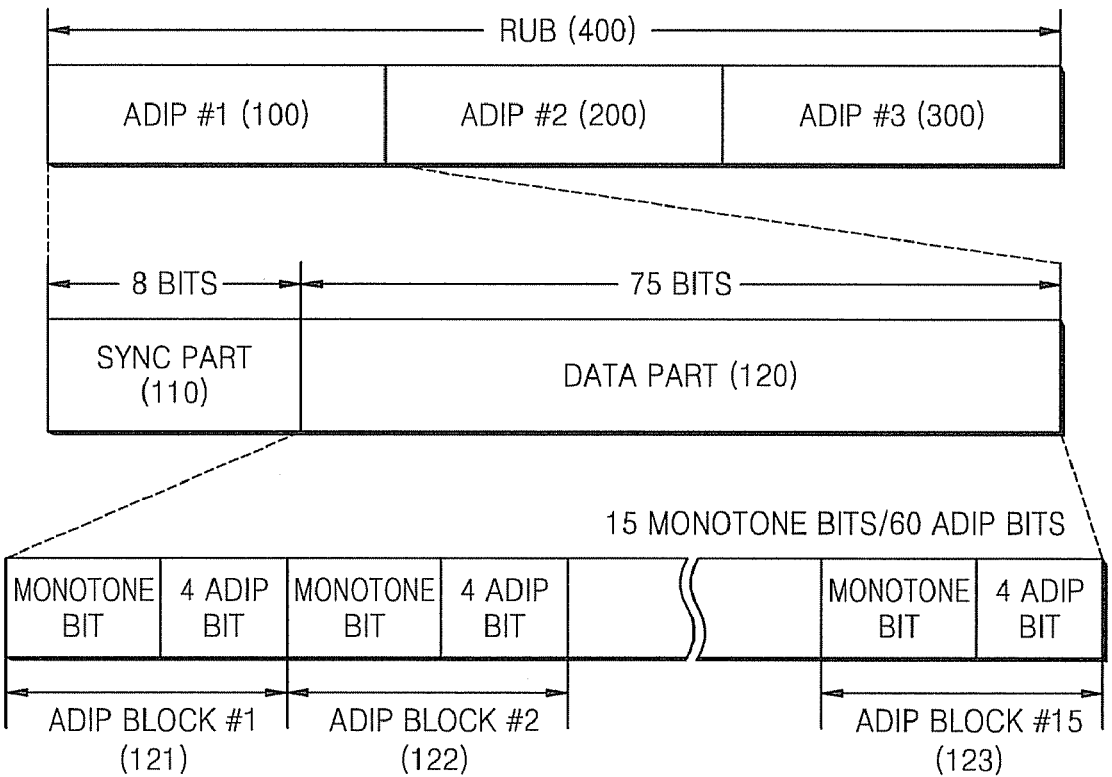
FIG. 4 is a diagram illustrating a detailed structure of the wobble address of FIG. 3.
Figure 5:
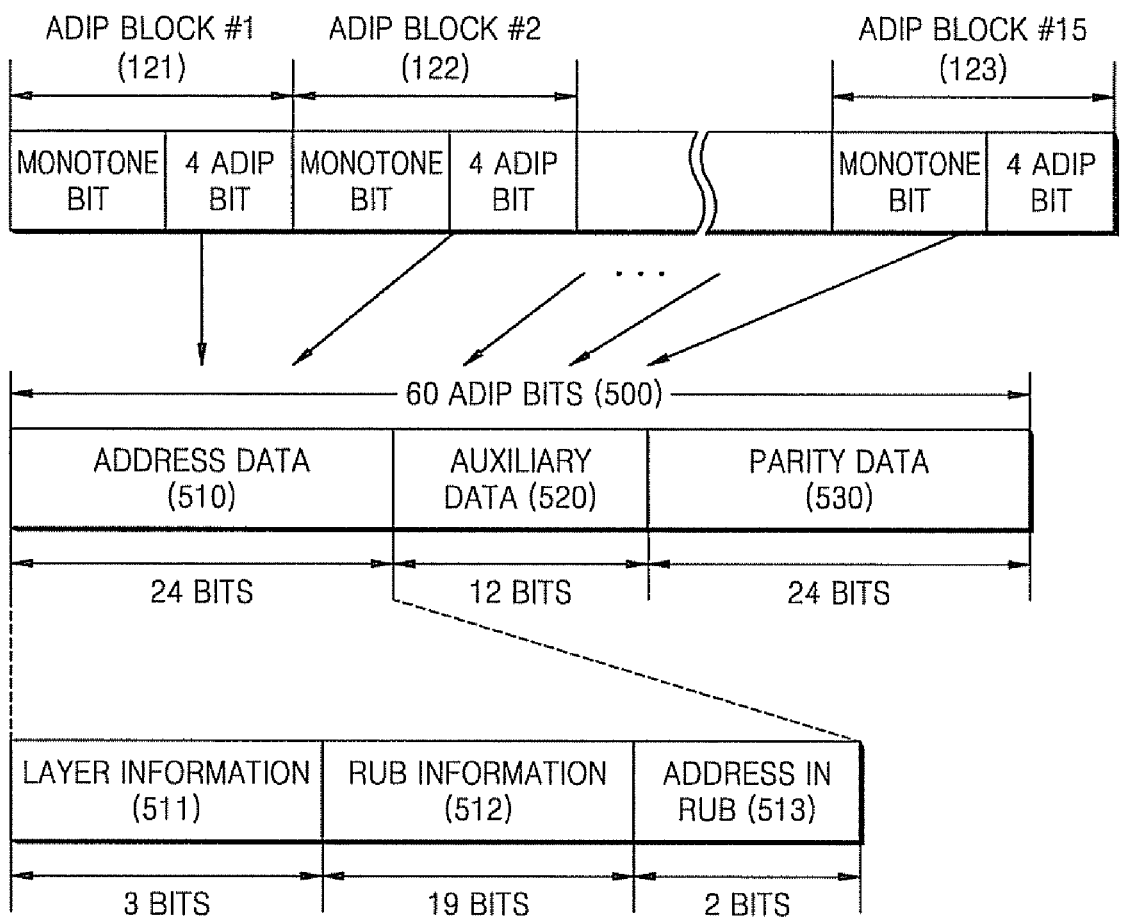
FIG. 5 is a diagram illustrating a more detailed structure of the wobble address of FIG. 4.

The address data 710 includes a reserved area 714 in 3 bits, layer information 711 in 3 bits, RUB information 712 in 20 bits, and an address in RUB 713 in 2 bits. Accordingly, $2^{20}$ different RUBs can be shown while maintaining the conventional size of an RUB. Although an address space expressed by the example embodiment illustrated in FIG. 7B is smaller than that of the example embodiment illustrated in FIG. 7A, 3 bits in the front of the address data 710 of the example embodiment illustrated in FIG. 7B are allocated a reserved area for compatibility with other standards.

FIG. 8 is a diagram illustrating a bit structure of the address data illustrated in FIGS. 7A and 7B. Referring to FIG. 8, ADIP address data 710 is 7 nibbles (where each nibble is 4 bits), auxiliary data 720 is 2 nibbles, and parity data 730 is 6 nibbles.

According to the bit structure illustrated in FIG. 8, a capacity can be increased by several tens of times compared to a conventional capacity by partially changing an address decoder or an auxiliary data decoder, without changing a form of a wobble address or an error correction coding (ECC) method.

In a method of allocating a wobble address suitable for a high density recording capacity of a disc according to another example embodiment of the present invention, twice as large of a capacity can be presented using a conventional address format without changing an allocation of address bits. In other words, twice as large of a capacity as compared to a conventional capacity can be assigned by differentiating a pattern of the bottom 2 bits of address information of 24 bits. Examples of an address in one RUB that can be shown by the bottom 2 bits are 00b, 01b, 10b, and 11b. 3 ADIPs are inserted to one RUB, so there is one space left. Accordingly, a disc is divided into two areas in one record layer, and in a first area, for example, 00b 01b 10b is indicated as an address, and in a second area, for example, 01b 10b 11b is indicated as an address. Consequently, the capacity can be doubled without changing an address decoder of a conventional system.

Figure 9:
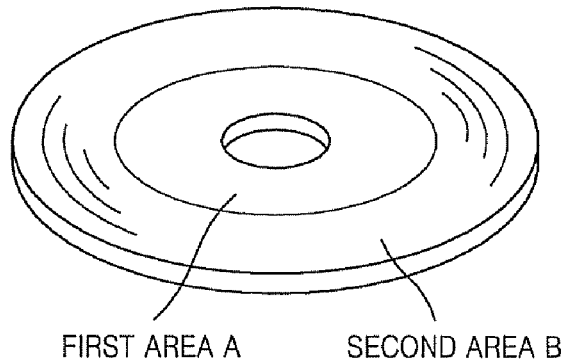
FIG. 9 is a diagram illustrating an optical recording medium divided into two areas according to an example embodiment of the present invention.

FIG. 9 is a diagram illustrating an optical recording medium divided into two areas according to an example embodiment of the present invention. Referring to FIG. 9, an optical disc, which is an optical recording medium includes a first area A and a second area B. Accordingly, twice as large of a capacity as compared to a conventional capacity can be represented by distinguishing the first area A and the second area B of the disc using a conventional address format.

Figure 10:
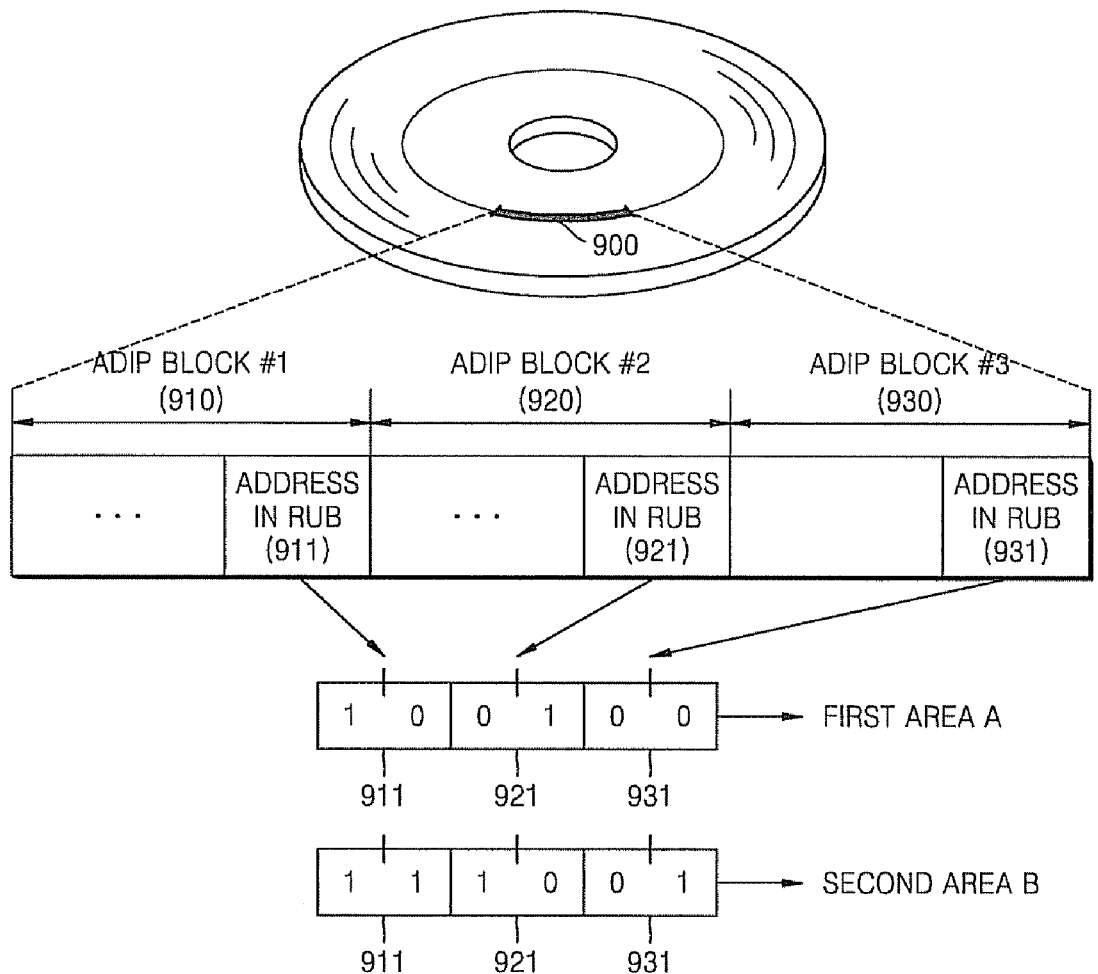
FIG. 10 is a diagram illustrating a method of distinguishing two areas of an optical recording medium using a conventional structure of a wobble address according to an example embodiment of the present invention.

FIG. 10 is a diagram illustrating a method of distinguishing two areas of an optical recording medium using a conventional structure of a wobble address according to an example embodiment of the present invention. Referring to FIG. 10, an RUB 900 of a disc corresponds to a wobble address including 3 ADIPs (i.e., an ADIP #1 910, an ADIP #2 920, and an ADIP #3 930). An address in RUB 911, an address in RUB 921, and an address in RUB 931 are respectively extracted from the ADIP #1 910, the ADIP #2 920, and the ADIP #3 930. Then, the extracted addresses are combined such that a first area A and a second area B of the disc can be distinguished from a pattern of the combined information.

In other words, the pattern of the combined information may have a first value indicating the first area A, or a second value indicating the second area B. In FIG. 10, for example, when the pattern is "10 01 00," the pattern indicates the first area A. In contrast, when the pattern is "11 10 01," the pattern indicates the second area B.

As described above, the first and second areas A and B can be distinguished using the entire patterns of combined information of 6 bits. However, aspects of the present invention are not limited there to. That is, other methods can be used to distinguish the first and second areas A and B.

For example, the addresses in RUB 911, 921, and 931 are each 2 bits. 4 pieces of information that can be expressed by 2 bits (i.e., 00, 01, 10, and 11). The first and second areas A and B are distinguished using 3 pieces of information from among the 4 pieces of information (since 3 ADIPs are inserted in one RUB, and 2 bits are extracted from each ADIP). Thus, when two different patterns express two areas, each pattern has two pieces of common information and 1 piece of individual information. Referring to FIG. 10, the pattern indicating the first area A and the pattern indicating the second area B include 2 pieces of common information (i.e., 10 and 01), and the pattern indicating the first area A further includes individual information 00, and the pattern indicating the second area B further includes individual information 11. Accordingly, the first and second areas A and B can be distinguished using the entire patterns. Alternatively, the patterns can be divided into common information and individual information, such that the first and second areas A and B are distinguished using the individual information.

According to aspects of the present invention as described in connection with FIG. 10, a capacity doubles as compared to a conventional capacity without changing a form of a wobble address, an ECC method, and a conventional address decoder.

Figure 11:
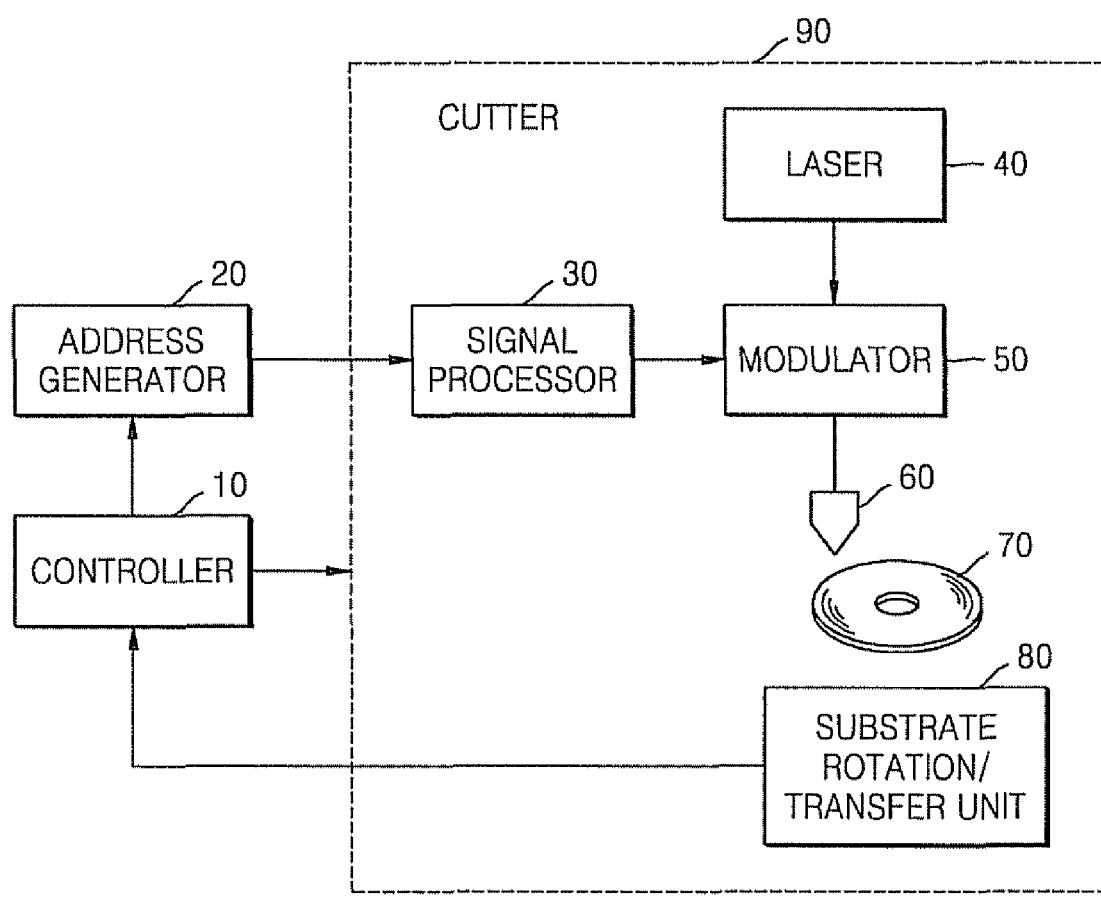
FIG. 11 is a schematic block diagram illustrating an apparatus for manufacturing an optical recording medium according to an example embodiment of the present invention.

FIG. 11 is a schematic block diagram illustrating an apparatus for manufacturing an optical recording medium according to an example embodiment of the present invention. Referring to FIG. 11, the apparatus includes a controller 10, an address generator 20, a signal processor 30, a laser 40, a modulator 50, a cutting head 60, and a disc substrate rotation/transfer unit 80. A process of manufacturing a disc includes applying photoresist on a polished glass substrate and performing a cutting, which forms a pit or groove on such a photosensitive film by exposure of a laser beam.

The address generator 20 sequentially generates address values.

A cutter 90 includes optical units 40, 50, and 60 that perform the cutting by irradiating a laser beam on a photoresisted glass substrate 70, the substrate rotation/transfer unit 80, which rotates and slide transfers the glass substrate 70, and the signal processor 30, which converts input data to record data and then supplies the record data to the optical units 40, 50, 60.

The modulator 50 modulates a beam emitted from a light source of the laser 40 based on the record data. The cutting head 60 concentrates the modulated beam from the modulator 50 and irradiates the modulated beam on a photoresist surface of the glass substrate 70.

The substrate rotate/transfer unit 80 rotates the glass substrate 70, slides the glass substrate 70 in a radius direction, and operates as a servo that controls tracking, or the like, of the cutting head 60.

The signal processor 30 formats the input data by adding, for example, an error correction code based on address information supplied from the address generator 20, and/or generates a modulation signal by performing a predetermined operation on the formatted input data.

Specifically, the address generator 20 generates the 28 bit address information so that a wobble address, corresponding to an RUB (i.e. a unit for recoding data) on the glass substrate 70, can be generated. The wobble address includes a plurality of ADIPs, and each ADIP includes address information in 28 bits, auxiliary information in 8 bits, and parity information in 24 bits. The address generator 20 provides the 28 bit address information to the signal processor 30. The signal processor 30 subsequently generates the wobble address by adding additional information to the address information of 28 bits, and adding parity information via an ECC process, or the like.

Alternatively, the address generator 20 generates address information so that a wobble address can be generated, wherein the wobble address includes a plurality of ADIPs corresponding to an RUB, which is a unit for recording data on the glass substrate 70. In particular, each ADIP includes address information about a location of the corresponding ADIP in the wobble address, and a first area and a second area are distinguished based on combined information of address information extracted from each ADIP. The address generator 20 provides the address information to the signal processor 30. The signal processor 30 subsequently generates the wobble address by adding additional information to the address information, and adding parity information via an ECC process, or the like.

While performing the cutting, the substrate rotation/transfer unit 80 rotates the glass substrate 70 at a uniform speed while sliding the glass substrate 70 so as to form a spiral track in a predetermined track pitch. Then, the beam emitted from the light source of the laser 40 is converted to the modulated beam through the modulator 50 based on the modulation signal from the signal processor 30. The modulated beam is irradiated to the photoresist surface of the glass substrate 70 from the cutting head 60. As a result, the photoresist surface is exposed based on data or groove.

The controller 10 controls the operation of the cutter 90 during the cutting, and controls the address generator 20 based on a cutting location of the substrate rotation/transfer unit 80.

Figure 12:
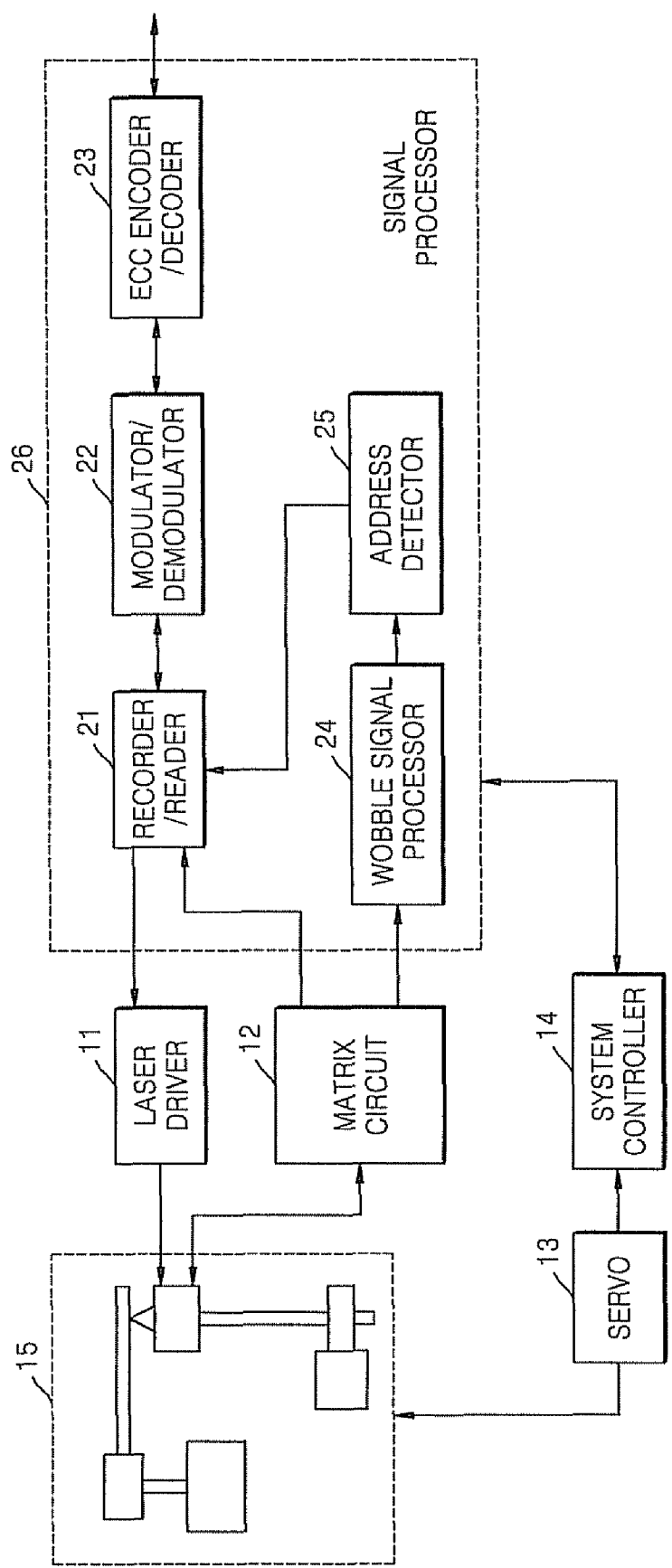
FIG. 12 is a schematic block diagram illustrating an apparatus for recording/reproducing data of an optical recording medium according to an example embodiment of the present invention.

FIG. 12 is a schematic block diagram illustrating an apparatus for recording/reproducing data of an optical recording medium according to an example embodiment of the present invention. Referring to FIG. 12, a disc drive device includes a pickup 15, a laser driver 11, a matrix circuit 12, a servo 13, a system controller 14, and a signal processor 26.

The pickup 15 reads embedded ADIP information as a wobbling of a groove track in a recordable area of an optical recording medium. During recording, user data is recorded as a phase change mark on the groove track in a recordable area by the pickup 15. During reproducing, the phase change mark recorded by the pickup 15 is read. A laser diode of the pickup 15 is laser radiation driven by a drive signal from the laser driver 11.

Reflection light information from the optical recording medium is detected by an optical detector (not shown), converted to an electric signal according to light acceptance amount, and transmitted to the matrix circuit 12. Upon receiving an output current from the optical detector, the matrix circuit 12 generates a high frequency signal corresponding to reproduction data, a servo control signal, and a signal related to a wobbling of the groove track.

The high frequency signal is transmitted to a recorder/reader 21, the servo control signal is transmitted to the server 13, and the signal related to a wobbling is transmitted to a wobble signal processor 24.

The recorder/reader 21 reproduces the user data, which is read as the phase change mark by binarization processing the high frequency signal and by generating a reproduction clock by PPL. Then, the recorder/reader 21 supplies the user data to a modulator/demodulator 22.

The modulator/demodulator 22 operates as a decoder during reproduction and as an encoder during recording. During the reproduction, an RLL code is demodulated based on the reproduction clock.

An ECC encoder/decoder 23 performs an ECC encode process (i.e., adds an error correction code) during the recording, and performs an ECC decode process (i.e., corrects an error) during the reproduction. Data decoded as the reproduction data by the ECC encoder/decoder 23 is read based on directions of the system controller 13 and is transmitted to an AV system (not shown).

A pushpull signal (i.e., a signal related to a wobbling from the matrix circuit 12) is processed in the wobble signal processor 24. The pushpull signal, as ADIP information, is demodulated in the wobble signal processor 24 as a data stream forming an ADIP address, and then supplied to the address detector 25.

The address detector 25 decodes supplied data in order to obtain an address value. Then, the address detector 25 supplies the address value to the system controller 14 and the recorder/reader 21.

Specifically, the wobble signal processor 24 processes a signal of a wobble address corresponding to an RUB, which is a unit for recording data on the optical recording medium. The wobble address includes a plurality of ADIPs, and each ADIP includes address information in 28 bits, auxiliary information in 8 bits, and parity information in 24 bits. Also, the address detector 25 detects the 28 bit address information from the wobble address.

Alternatively, the wobble signal processor 24 processes a signal of a wobble address corresponding to an RUB, which is a unit for recording data on the optical recording medium. In particular, the wobble address includes a plurality of ADIPs, and each ADIP includes address information on a location of the corresponding ADIP in the wobble address, and a first area and a second area are distinguished based on combined information of the address information extracted from each ADIP. Accordingly, the address detector 25 detects whether the wobble address is an address of the first area or the second area, and detects the address information from each area.

Aspects of the present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments for accomplishing aspects of the present invention can be easily construed by programmers skilled in the art to which the present invention pertains.

According to aspects of the present invention, a wobble address space that can be allocated per recording surface can be expanded without changing a form of a wobble address or an ECC.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, according to another embodiment of the present invention, the reserved area may be less than or greater than 3 bits and, accordingly, the recording unit block address information may be less than or greater than 20 bits. Therefore, it is intended that the present invention not be limited to the various example embodiments disclosed, but that the present invention includes all embodiments falling within the scope of the appended claims.

What is claimed is:

1. An optical recording medium to be executed by a recording/reproducing apparatus, the optical recording medium comprising:
   a recording unit block on which data is recorded/reproduced by the recording/reproducing apparatus; and
   a wobble address corresponding to the recording unit block, the wobble address comprising a plurality of wobble address units,
   each wobble address unit comprising address information indicating an address of the recording unit block on the optical recording medium in 28 bits, auxiliary information in 8 bits, and parity information in 24 bits.

2. The optical recording medium as claimed in claim 1, wherein the address information comprises:
   3 bit layer information indicating a layer number of the recording unit block on the optical recording medium;
   23 bit recording unit block address information indicating the address of the recording unit block on the optical recording medium; and 2 bit address information indicating an address of the corresponding wobble address unit in the recording unit block.

3. The optical recording medium as claimed in claim 1, wherein the address information comprises:
   a 3 bit reserved area;
   3 bit layer information indicating a layer number of the recording unit block on the optical recording medium;
   20 bit recording unit block address information indicating the address of the recording unit block on the optical recording medium; and
   2 bit address information indicating an address of the corresponding wobble address unit in the recording unit block.

4. An optical recording medium having a first area and a second area on which data is recorded/reproduced by a recording/reproducing apparatus, the optical recording medium comprising:
   a recording unit block on which the data is recorded or reproduced; and
   a wobble address corresponding to the recording unit block and indicating a location of the recording unit block in the optical recording medium, the wobble address comprising a plurality of address units (ADIPs),
   each ADIP comprising address information indicating a location of the corresponding ADIP in the recording unit block, such that the recording/reproducing apparatus determines whether the recording unit block is in the first area or the second area of the optical recording medium, according to a combination of the address information of all of the plurality of ADIPs.

5. The optical recording medium as claimed in claim 4, wherein:
   the wobble address comprises 3 ADIPs; and
   the address information is 2 bits, such that the combination of the address information is 6 bits.

6. The optical recording medium as claimed in claim 5, wherein:
   when the 6 bit combination of the address information is a first value, the wobble address is an address of the first area; and
   when the 6 bit combination of the address information is a second value, the wobble address is an address of the second area.

7. The optical recording medium as claimed in claim 6, wherein:
   the first value comprises 4 bit common information and 2 bit individual information, the 2 bit individual information corresponding to the first area; and
   the second value comprises 4 bit common information and 2 bit individual information, the 2 bit individual information corresponding to the second area.

8. A manufacturing apparatus for manufacturing an optical recording medium, the manufacturing apparatus comprising:
   a controller configured to control a generation of a wobble address on the optical recording medium corresponding to a recording unit block on which data is recorded/reproduced on/from the optical recording medium, the wobble address comprising a plurality of wobble address units, each wobble address unit comprising address information indicating an address of the recording unit block on the optical recording medium in 28 bits, auxiliary information in 8 bits, and parity information in 24 bits; and
   a cutter configured to cut the generated wobble address on the optical recording medium according to a control of the controller.

9. The manufacturing apparatus as claimed in claim 8, wherein the address information comprises:
   3 bit layer information indicating a layer number of the recording unit block on the optical recording medium;
   23 bit recording unit block address information indicating the address of the recording unit block on the optical recording medium; and
   2 bit address information indicating an address of the corresponding wobble address unit in the recording unit block.

10. The manufacturing apparatus as claimed in claim 8, wherein the address information comprises:
    a 3 bit reserved area;
    3 bit layer information indicating a layer number of the recording unit block on the optical recording medium;
    20 bit recording unit block address information indicating the address of the recording unit block on the optical recording medium; and
    2 bit address information indicating an address of the corresponding wobble address unit in the recording unit block.

11. A manufacturing apparatus for manufacturing an optical recording medium having a first area and a second area on which data is recorded/reproduced by a recording/reproducing apparatus, the manufacturing apparatus comprising:
    a controller configured to control a generation of a wobble address on the optical recording medium corresponding to a recording unit block on which data is recorded/reproduced on/from the optical recording medium, the wobble address comprising a plurality of address units (ADIPs), each ADIP comprising address information indicating a location of the corresponding ADIP in the recording unit block, such that the recording/reproducing apparatus determines whether the recording unit block is in the first or the second area of the optical recording medium, according to a combination of the address information from all of the plurality of ADIPs; and
    a cutter configured to cut the wobble address on the optical recording medium according to a control of the controller.

12. The manufacturing apparatus as claimed in claim 11, wherein:
    the wobble address comprises 3 ADIPs; and
    the address information is 2 bits, such that the combination of the address information is 6 bits.

13. The manufacturing apparatus as claimed in claim 12, wherein:
    when the 6 bit combination of the address information is a first value, the wobble address is an address of the first area; and
    when the 6 bit combination of the address information is a second value, the wobble address is an address of the second area.

14. The manufacturing apparatus as claimed in claim 13, wherein:
    the first value comprises 4 bit common information and 2 bit individual information, the 2 bit individual information corresponding to the first area; and
    the second value comprises 4 bit common information and 2 bit individual information, the 2 bit individual information corresponding to the second area.

15. An apparatus for recording/reproducing data of an optical recording medium, the apparatus comprising:
    a signal processor configured to process a signal of a wobble address from the optical recording medium, the wobble address corresponding to a recording unit block on which the data is recorded/reproduced on/from the optical recording medium, the wobble address comprising a plurality of wobble address units, each wobble address unit comprising address information indicating an address of the recording unit block on the optical recording medium in 28 bits, auxiliary information in 8 bits, and parity information in 24 bits; and a controller configured to control the signal processor to:
record the data on the recording unit block corresponding to the wobble address detected by processing the signal; or
read the data from the recording unit block corresponding to the wobble address.

16. The apparatus as claimed in claim 15, wherein the address information comprises:
3 bit layer information indicating a layer number of the recording unit block on the optical recording medium;
23 bit recording unit block address information indicating the address of the recording unit block on the optical recording medium; and 2 bit address information of indicating an address of the corresponding wobble address unit in the recording unit block.

17. The apparatus as claimed in claim 15, wherein the address information comprises:
a 3 bit reserved area;
3 bit layer information indicating a layer number of the recording unit block on the optical recording medium;
20 bit recording unit block address information indicating the address of the recording unit block on the optical recording medium; and
2 bit address information indicating an address of the corresponding wobble address unit in the recording unit block.

18. An apparatus for recording/reproducing data of an optical recording medium having a first area and a second area, the apparatus comprising:
a signal processor configured to process a signal of a wobble address from the optical recording medium, the wobble address corresponding to a recording unit block on which the data is recorded/reproduced on/from the optical recording medium, the wobble address comprising a plurality of address units (ADIPs), each ADIP comprising address information indicating a location of the corresponding ADIP in the recording unit block, such that the apparatus determines whether the recording unit block is in the first area or the second area of the optical recording medium, according to a combination of the address information of all of the plurality of ADIPs; and
a controller configured to control the signal processor to:
record the data on the recording unit block corresponding to the wobble address detected by processing the signal; or
read the data from the recording unit block corresponding to the wobble address.

19. The apparatus as claimed in claim 18, wherein:
the wobble address comprises 3 ADIPs; and
the address information is 2 bits, such that the combination of the address information is 6 bits.

20. The apparatus as claimed in claim 19, wherein:
when the 6 bit combination of the address information is a first value, the wobble address is an address of the first area; and
when the 6 bit combination of the address information is a second value, the wobble address is an address of the second area.

21. The apparatus as claimed in claim 20, wherein:
the first value comprises 4 bit common information and 2 bit individual information, the 2 bit individual information corresponding to the first area; and
the second value comprises 4 bit common information and 2 bit individual information, the 2 bit individual information corresponding to the second area.

22. A method of manufacturing an optical recording medium, the method comprising:
generating a wobble address corresponding to a recording unit block on which data is recorded/reproduced on/from the optical recording medium, wherein the wobble address comprises a plurality of wobble address units, and each wobble address unit comprises address information indicating an address of the recording unit block on the optical recording medium in 28 bits, auxiliary information in 8 bits, and parity information in 24 bits; and
cutting the generated wobble address on the optical recording medium.

23. The method as claimed in claim 22, wherein the address information comprises:
3 bit layer information indicating a layer number of the recording unit block on the optical recording medium;
23 bit recording unit block address information indicating the address of the recording unit block on the optical recording medium; and
2 bit address information indicating an address of the corresponding wobble address unit in the recording unit block.

24. The method as claimed in claim 22, wherein the address information comprises:
a 3 bit reserved area;
3 bit layer information indicating a layer number of the recording unit block on the optical recording medium;
20 bit recording unit block address information indicating the address of the recording unit block on the optical recording medium; and
2 bit address information indicating an address of the corresponding wobble address unit in the recording unit block.

25. A method of manufacturing an optical recording medium having a first area and a second area on which data is recorded/reproduced by a recording/reproducing apparatus, the method comprising:
generating a wobble address on the optical recording medium corresponding to a recording unit block on which the data is recorded/reproduced on/from the optical recording medium, the wobble address comprising a plurality of address units (ADIPs), each ADIP comprising address information indicating a location of the corresponding ADIP in the recording unit block, such that the recording/reproducing apparatus determines whether the recording unit block is in the first area or the second area, according to a combination of the address information from all of the plurality of ADIPs; and
cutting the wobble address on the optical recording medium.

26. A method of recording/reproducing data of an optical recording medium, the method comprising:
processing a signal of a wobble address from the optical recording medium, the wobble address corresponding to a recording unit block on which the data is recorded/reproduced on/from the optical recording medium, the wobble address comprising a plurality of wobble address units, each wobble address unit comprising address information indicating an address of the recording unit block on the optical recording medium in 28 bits, auxiliary information in 8 bits, and parity information in 24 bits; and recording the data on the recording unit block corresponding to the wobble address detected by the processing of the signal or reading the data from the recording unit block corresponding to the wobble address.

27. The method as claimed in claim 26, wherein the address information comprises:
- 3 bit layer information indicating a layer number of the recording unit block on the optical recording medium;
- 23 bit recording unit block address information indicating the address of the recording unit block on the optical recording medium; and
- 2 bit address information of indicating an address of the corresponding wobble address unit in the recording unit block.

28. The method as claimed in claim 26, wherein the address information comprises:
- a 3 bit reserved area;
- 3 bit layer information indicating a layer number of the recording unit block on the optical recording medium;
- 20 bit recording unit block address information indicating the address of the recording unit block on the optical recording medium; and
- 2 bit address information indicating an address of the corresponding wobble address unit in the recording unit block.

29. A method of recording/reproducing data of an optical recording medium having a first area and a second area, the method comprising:

processing a signal of a wobble address from the optical recording medium, the wobble address corresponding to a recording unit block on which the data is recorded/reproduced on/from the optical recording medium, the wobble address comprising a plurality of address units (ADIPs), each ADIP comprising address information indicating a location of the corresponding ADIP in the recording unit block, such that it is determined whether the recording unit block is in the first area or the second area, according to a combination of the address information of all of the plurality of ADIPs; and recording the data on the recording unit block corresponding to the wobble address detected by the processing of the signal or reading the data from the recording unit block corresponding to the wobble address.

* * * * *